(12) United States Patent
Shiffler et al.

(10) Patent No.: US 10,794,414 B2
(45) Date of Patent: Oct. 6, 2020

(54) BODY BOUND SHEAR CONNECTION (71) Applicant: Hendrickson USA, L.L.C., Itasca, IL (US)

(72) Inventors: Jason P. Shiffler, Naperville, IL (US); Ashley T. Dudding, Yorkville, IL (US); Joseph A. Schneider, Chicago, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 16/463,030

(22) PCT Filed: Nov. 22, 2017

(86) PCT No.: PCT/US2017/062927
§ 371 (c)(1),
(2) Date: May 22, 2019

(87) PCT Pub. No.: WO2018/098215
PCT Pub. Date: May 31, 2018

(65) Prior Publication Data
US 2019/0277324 A1 Sep. 12, 2019

Related U.S. Application Data (60) Provisional application No. 62/425,867, filed on Nov. 23, 2016.

(51) Int. Cl.
B23Q 3/08 (2006.01)
F16B 17/00 (2006.01)
(Continued)

(52) U.S. Cl.
CPC ............ F16B 17/008 (2013.01); B62D 21/02 (2013.01); B62D 21/09 (2013.01); F16B 7/18 (2013.01);
(Continued)

(58) Field of Classification Search
USPC ............ 269/29; 29/505, 510, 515, 521, 525, 29/525.01
See application file for complete search history.

(56) References Cited

U.S. PATENT DOCUMENTS

| 2,499,315 A | 2/1950 | Johnson |
| 2008/0317545 A1 | 12/2008 | Hirose et al. |

(Continued)

FOREIGN PATENT DOCUMENTS

| DE | 10 2009 034782 A1 | 1/2011 |
| DE | 10 2013 004993 A1 | 9/2014 |

OTHER PUBLICATIONS

International Search Report and Written Opinion of the International Searching Authority for PCT Patent Application No. PCT/US2017/062927, dated Feb. 13, 2018.

Primary Examiner — Joseph J Hail
Assistant Examiner — Shantese L McDonald
(74) Attorney, Agent, or Firm — Cook Alex Ltd.

(57) ABSTRACT

A joint is formed between first and second workpieces. The first workpiece defines a cavity, while the second workpiece includes a shear member. The shear member is at least partially inserted into the cavity to secure the first workpiece to the second workpiece. One of the workpieces has a lower hardness and/or shear strength than the other workpiece and includes at least one shear tab with a base portion and an end portion. In inserting the shear member into the cavity, the end portion of the shear tab is broken away from the base portion, leaving the base portion to extend between the cavity and the shear member, thereby securing the first workpiece to the second workpiece.

14 Claims, 10 Drawing Sheets (51) Int. Cl.
*B62D 21/02* (2006.01)
*B62D 21/09* (2006.01)
*F16B 7/18* (2006.01)
*F16B 43/00* (2006.01)
*F16B 41/00* (2006.01)

(52) U.S. Cl.
CPC .. *B60G 2200/315* (2013.01); *B60G 2200/343* (2013.01); *B60G 2204/143* (2013.01); *B60G 2204/4302* (2013.01); *B60G 2204/4306* (2013.01); *B60G 2206/124* (2013.01); *B60G 2206/8207* (2013.01); *B60G 2206/82092* (2013.01); *B60G 2206/91* (2013.01); *B60G 2300/026* (2013.01); *F16B 41/002* (2013.01); *F16B 43/00* (2013.01)

(56) References Cited

U.S. PATENT DOCUMENTS

| | | | |
|---|---|---|---|
| 2009/0003928 A1* | 1/2009 | Ohrstrom | E06B 3/9647 403/205 |
| 2010/0253075 A1* | 10/2010 | Werth | F16L 23/04 285/331 |
| 2013/0055848 A1* | 3/2013 | Hind | B60T 7/104 74/519 |
| 2014/0259626 A1 | 9/2014 | Dilworth | |
| 2015/0059153 A1 | 3/2015 | Diehl et al. | |
| 2015/0128386 A1* | 5/2015 | Lepper | F16B 5/0657 24/458 |

\* cited by examiner

BODY BOUND SHEAR CONNECTION

RELATED APPLICATIONS

This application is a U.S. national stage application of PCT Patent Application Serial No. PCT/US2017/062927, filed Nov. 22, 2017, which claims the benefit of and priority of U.S. Provisional Patent Application Ser. No. 62/425,867, filed Nov. 23, 2016, the contents of which are incorporated by reference herein.

DESCRIPTION

Technical Field

The present subject matter relates to joints for securing one workpiece to a second workpiece. More particularly, the present subject matter relates to a joint in which a portion of a shear tab of one of the workpieces is broken away in securing the workpieces to each other.

BACKGROUND

It is well known to secure two or more components of an assembly together using mechanical fasteners. Among the typical mechanical fasteners used, which depend upon a number of factors, are bolts and rivets. For heavy-duty applications (i.e., joints that must be capable of withstanding relatively high loads and stresses), a relatively great number of fasteners and/or relatively heavy fasteners must be employed to create a sufficiently strong joint.

One alternative to the use of mechanical fasteners is a press-fit. In a press-fit, a formation or member of one component is pressed or inserted into a cavity or aperture of another component. The formation or member has at least one dimension (e.g., a width) that is greater than the corresponding dimension of the associated cavity or aperture. When the formation or member is pressed or inserted into the associated cavity or aperture, one or the other deforms or stretches to create a tight fit therebetween, thus securing the two components together. This press-fit may be supplemented with one or more mechanical fasteners for a stronger joint, but fewer fasteners than would be required in the absence of the press-fit. However, while a press-fit may be advantageous to the extent that it can reduce the required number of fasteners, it may have certain disadvantages as well. For example, the critical dimension(s) of the formation or member and the cavity or aperture must be carefully toleranced to ensure that a proper press-fit is achieved. If the dimensions are not properly controlled and the formation or member is too small, then a sufficiently strong press-fit will not be created and the two components may become separated from each other. On the other hand, if the formation or member is too large, then it may not be able to be properly pressed into the cavity or aperture, thus preventing a complete and secure joint.

Accordingly, it would be advantageous to be able to create a joint that requires a relatively low number of mechanical fasteners without the disadvantages of a press-fit.

SUMMARY

There are several aspects of the present subject matter which may be embodied separately or together in the devices, systems, and methods described and/or claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto or later amended.

In one aspect, a joint comprises a first workpiece defining a cavity and a second workpiece including a shear member at least partially received within the cavity to secure the first workpiece to the second workpiece. One of the first and second workpieces has a lower hardness and/or shear strength than the other workpieces, with the workpiece having the lower hardness and/or shear strength including at least one shear tab. The shear tab has a base portion and an end portion. The base portion of the shear tab extends between the cavity and the shear member, while the end portion of the shear tab is broken away in securing the first workpiece to the second workpiece.

In another aspect, a method of joining first and second workpiece includes providing a first workpiece defining a cavity and a second workpiece including a shear member. One of the workpieces has a lower hardness and/or shear strength than the other workpiece, with the workpiece having the lower hardness and/or shear strength including at least one shear tab having a base portion and an end portion. At least a portion of the shear member is inserted into the cavity so as to break away the end portion of the shear tab, with the base portion of the shear tab extending between the cavity and the shear member to secure the first workpiece to the second workpiece.

DETAILED DESCRIPTION OF THE ILLUSTRATED EMBODIMENTS

The embodiments disclosed herein are for the purpose of providing an exemplary description of the present subject matter. They are, however, only exemplary and not exclusive, and the present subject matter may be embodied in various forms. Therefore, specific details disclosed herein are not to be interpreted as limiting the subject matter as defined in the accompanying claims.

Figure 1:
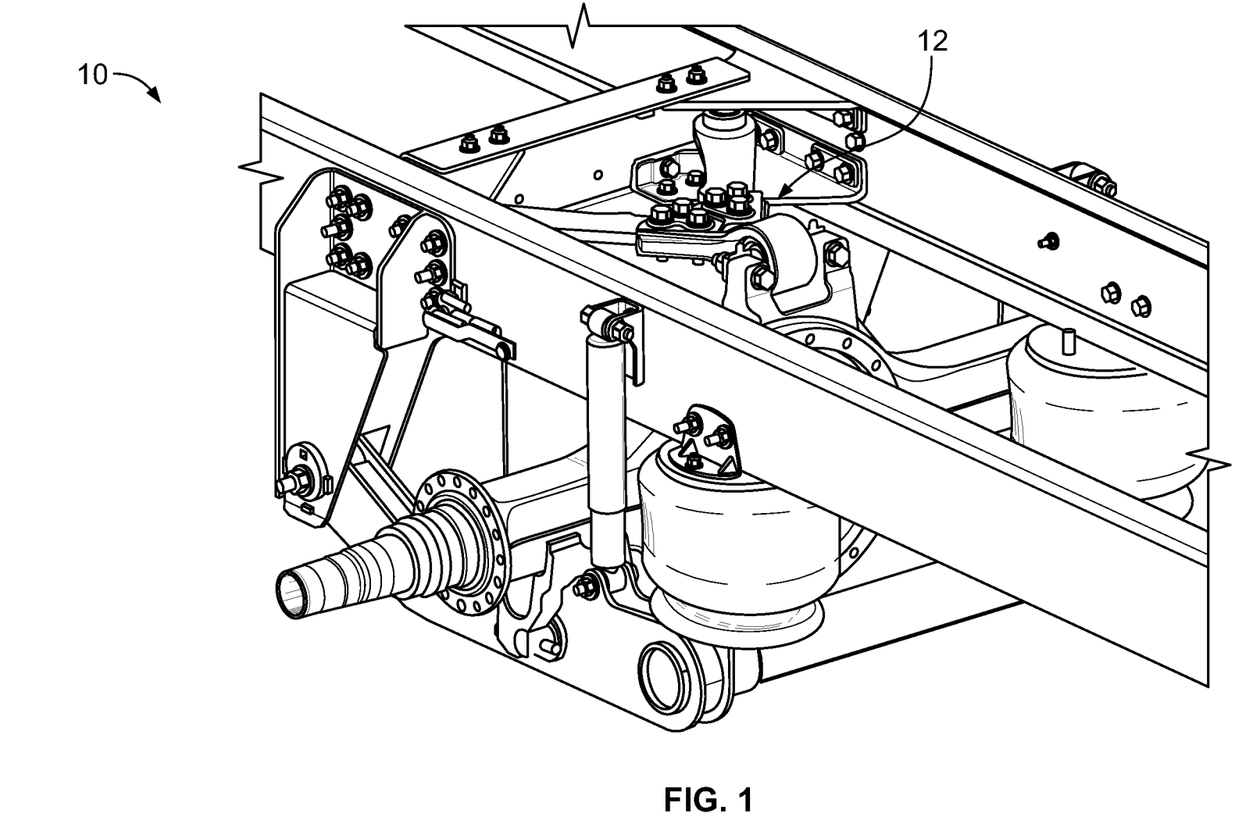
FIG. 1 is a perspective view of a vehicle suspension incorporating a fabricated V-rod according to an aspect of the present disclosure.
Figure 2:
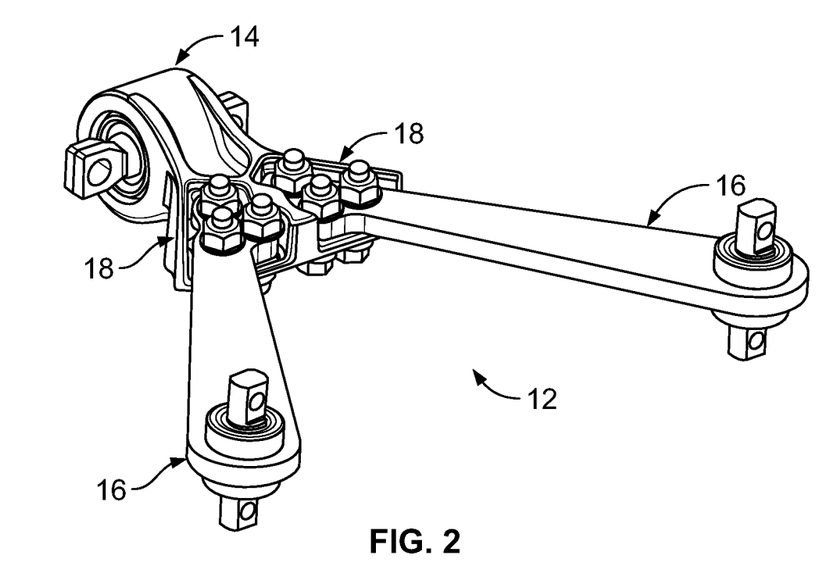
FIG. 2 is a bottom perspective view of the fabricated V-rod of FIG. 1, with components joined by a body bound shear connection or joint according to an aspect of the present disclosure.
Figure 3:
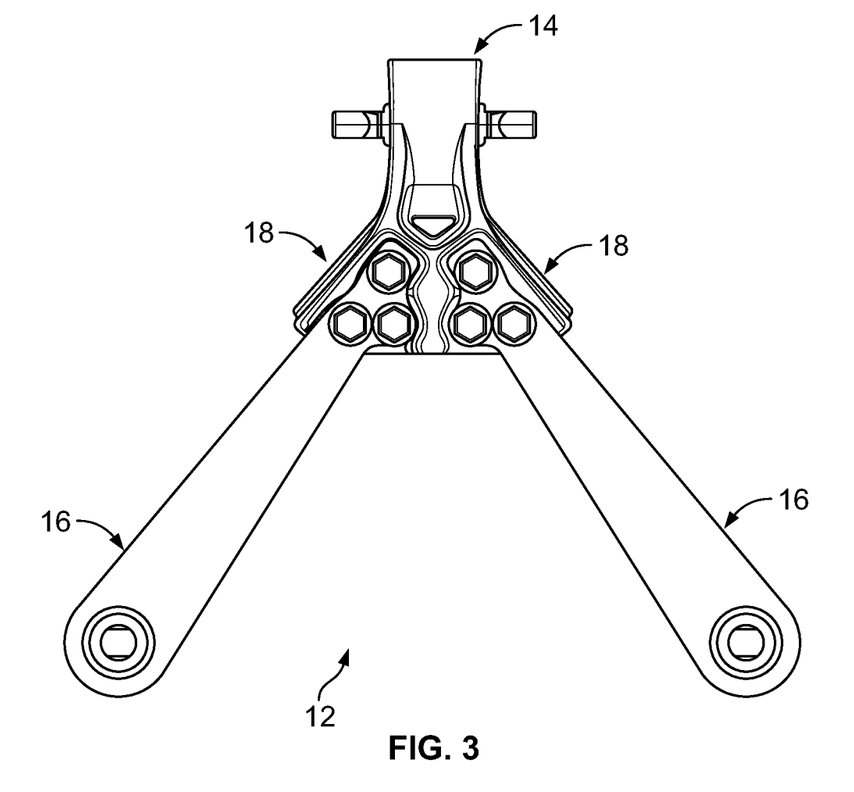
FIG. 3 is a bottom plan view of the V-rod of FIG. 2.

FIG. 1 illustrates a vehicle suspension 10 incorporating a V-rod 12 constructed according to an aspect of the present disclosure. The V-rod 12 (shown in greater detail in FIGS. 2 and 3) has a fabricated construction, with a head 14 being connected to two legs 16.

Figure 4:
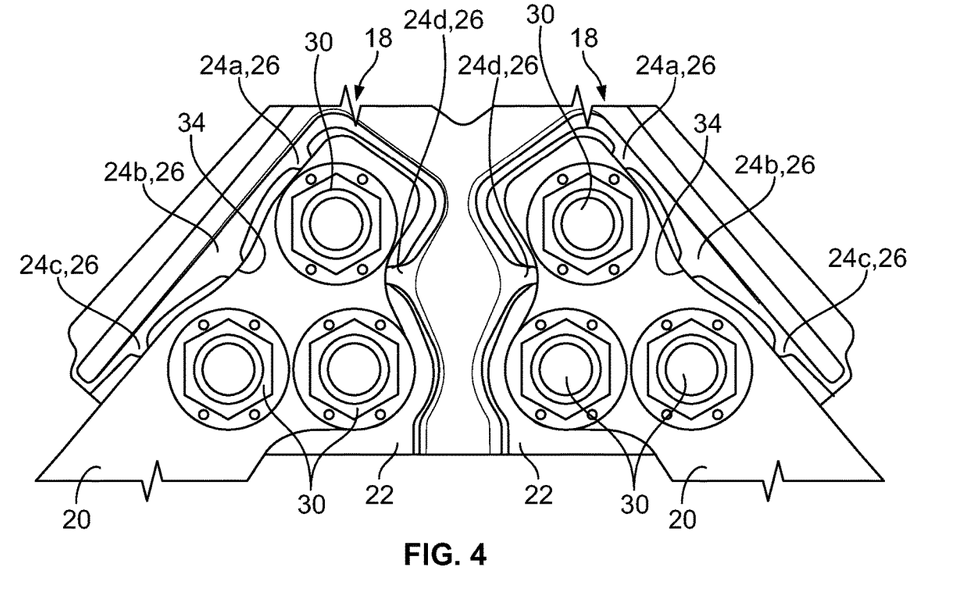
FIG. 4 is a detail plan view of the body bound shear connection or joint of the V-rod of FIG. 2.
Figure 5:
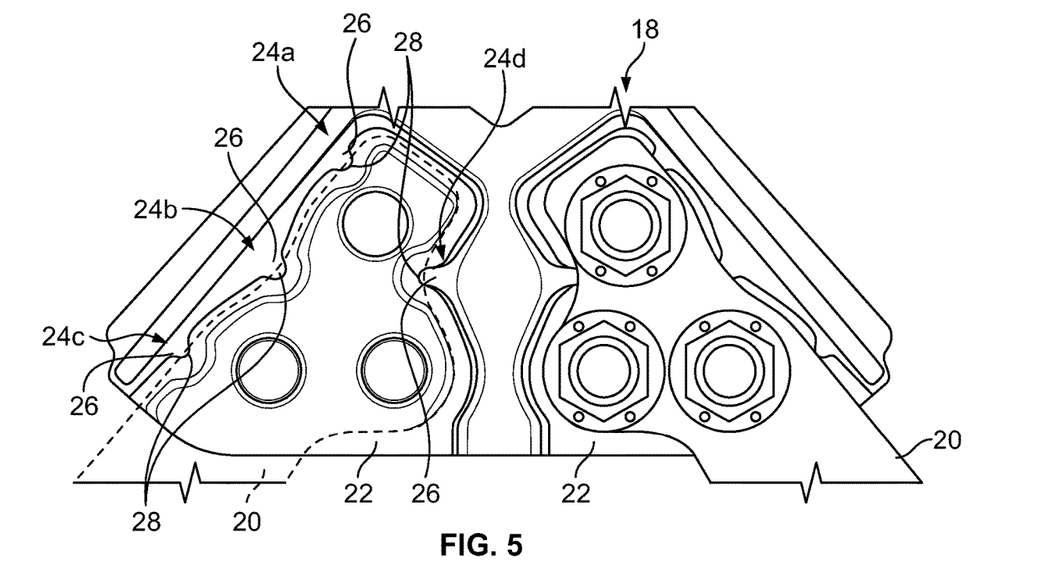
FIG. 5 is a detail plan view of the body bound shear connection or joint of the V-rod of FIG. 2 with one component of the V-rod shown in phantom.

The head 14 of the V-rod 12 is secured to each of the legs 16 by separate body bound shear connections or joints 18, which are shown in greater detail in FIGS. 4 and 5. Each joint 18 is formed by an end 20 of a leg 16 (which portion of the leg 16 comprises a shear member) that is received by a cavity 22 of the head 14. Each cavity 22 (shown in greater detail in FIGS. 6 and 7) includes at least one shear tab 24a-24d (collectively referred to herein as shear tabs 24) that extends into the open interior of the cavity 22. If a cavity 22 includes a plurality of shear tabs 24, as in the illustrated embodiment, all of the shear tabs 24 may be substantially identical or differently configured.

Figure 6:
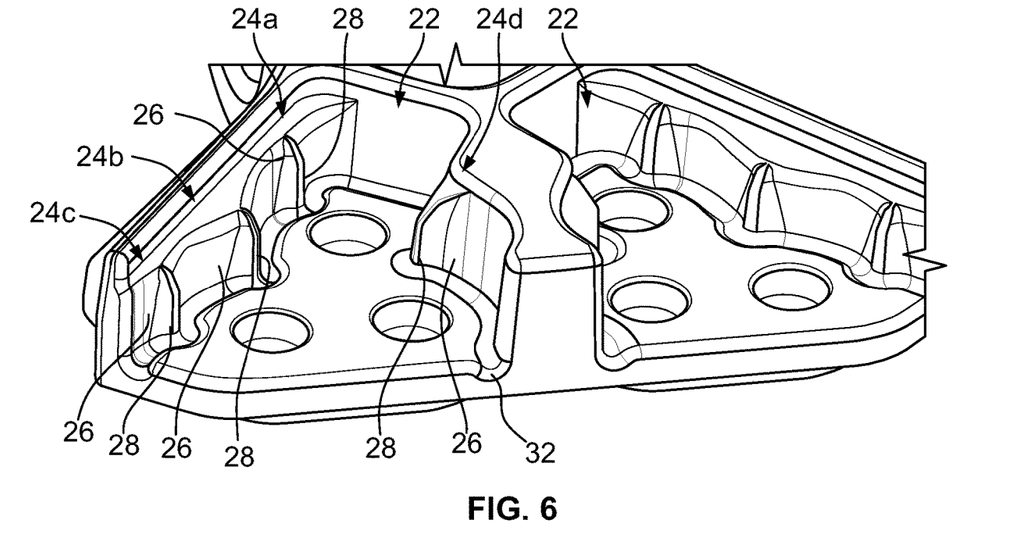
FIG. 6 is a detail perspective view of two cavities of one of the components of the V-rod of FIG. 2.
Figure 7:
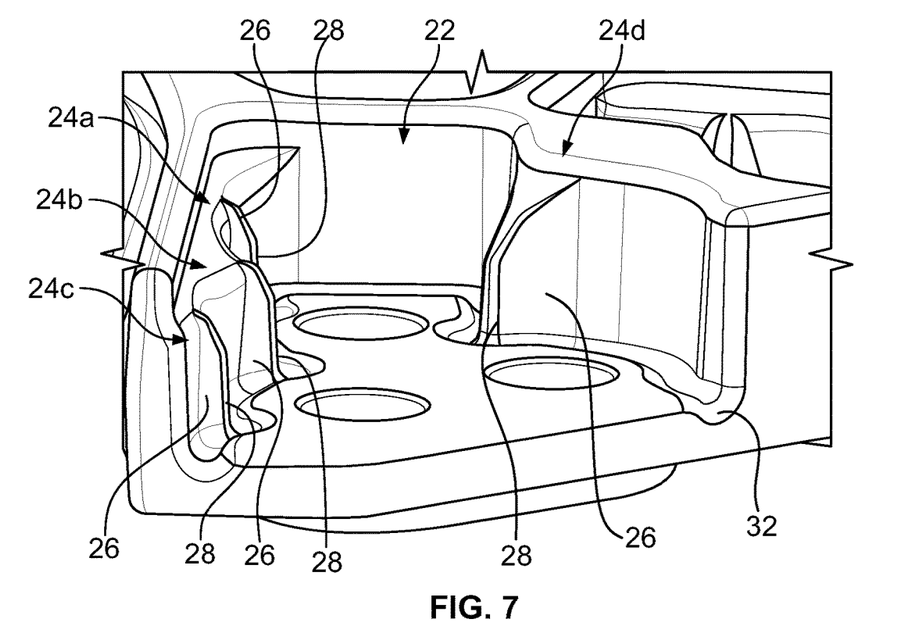
FIG. 7 is a detail perspective view of one of the cavities of FIG. 6.

Regardless of the particularly configuration of an individual shear tab 24, each shear tab 24 includes a base portion 26 and an end portion 28 (FIGS. 5-7). The base portion 26 is associated with the perimeter of the cavity 22, while the end portion 28 is associated with the base portion 26 and is positioned closer to the center of the open interior of the cavity 22. It should be understood that there is not necessarily a well-defined distinction between the base and end portions 26 and 28 of a shear tab 24, but rather, the end portion 28 may be understood as the region of the shear tab 24 that initially occupies the area of the cavity 22 that is ultimately occupied by the shear member 20 of the leg 16 when the body bound shear connection or joint 18 has been formed (see FIG. 5). However, in general, it may be advantageous for a shear tab 24 to have a tapered configuration (FIGS. 6 and 7), being wider and/or taller adjacent to the perimeter of the cavity 22 (i.e., at the base portion 26) than closer to the center of the open interior of the cavity 22 (i.e., at the end portion 28). Such a configuration tends to give the base portion 26 a greater strength than the end portion 28, which may be advantageous when creating the body bound shear connection or joint 18, as will be described in greater detail. Additionally, a shear tab 24 with a tapered height (decreasing from a maximum at the perimeter of the cavity 22 to a minimum at the end portion 28, closest to the center of the open interior of the cavity 22) may serve to properly orient the end or shear member 20 of the leg 16 as it is advanced into the cavity 22 to form the body bound shear connection or joint 18, as will be described.

The end or shear member 20 of the leg 16 may have a perimeter that is generally congruent with the perimeter of the cavity 22, but a smaller size so that at least a portion of the shear member 20 may be received within the cavity 22. The particular shape of the shear member 20 and, hence, the cavity 22 may vary without departing from the scope of the present disclosure. In the illustrated embodiment, the shear member 20 is configured to receive three mechanical fasteners 30 (e.g., bolts), which affects the shape of the perimeter of the shear member 20 and, hence, the associated cavity 22. The shear member 20 is shaped to accommodate the three mechanical fasteners 30 in an arrangement that is advantageous for orienting the leg 16 at the necessary position with respect to the head 14 of the V-rod 12 and providing sufficient material surrounding each mechanical fastener 30. In other embodiments, a shear member 24 and associated cavity 22 may have any other suitable shape and configuration.

Figure 8:
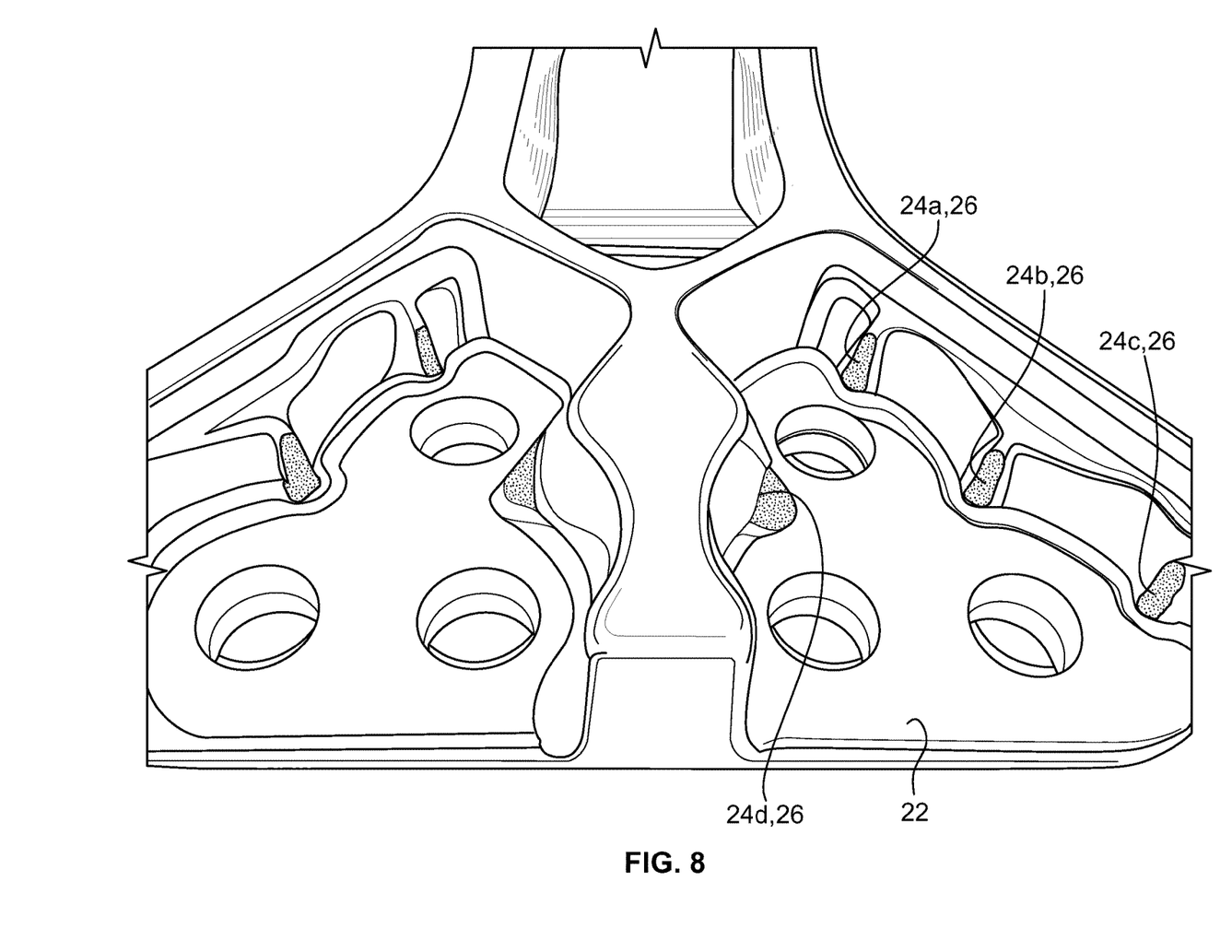
FIG. 8 is a detail perspective view of the two cavities of FIG. 6, with shear tabs of the cavities having end portions broken away in creating the body bound shear connection or joint.
Figure 9:
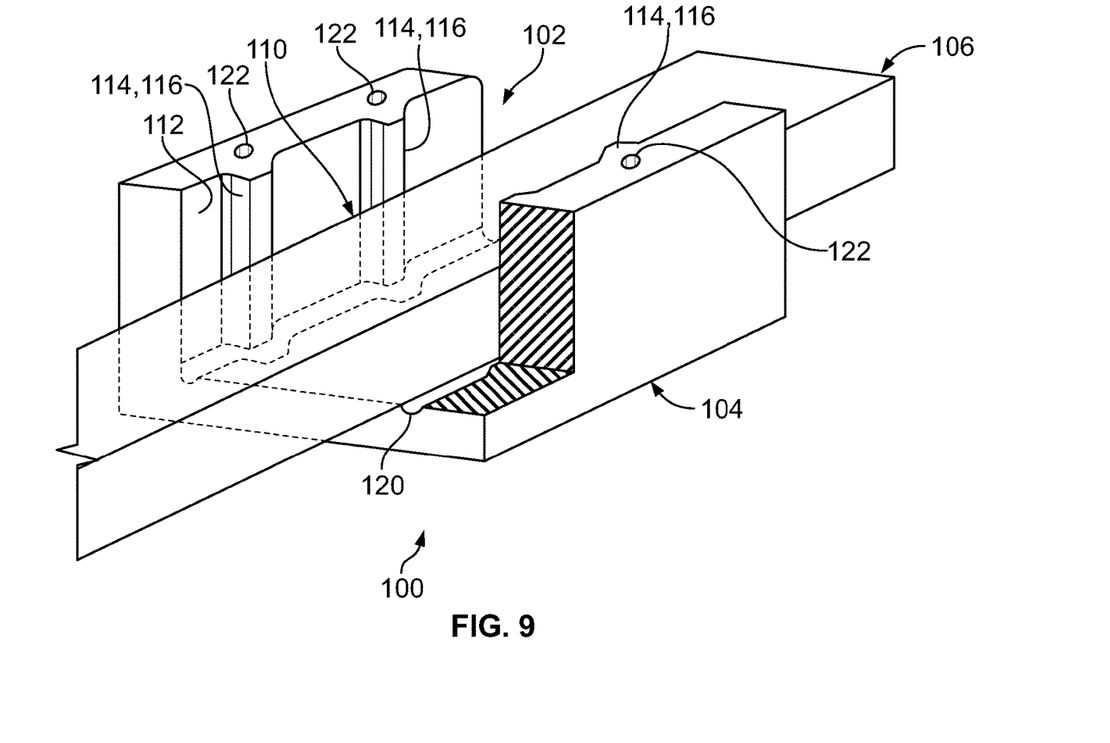
FIG. 9 is a front perspective view of a leaf spring seat incorporating a body bound shear connection or joint according to an aspect of the present disclosure.

The perimeter of the shear member 20 is spaced inwardly of the perimeter of the cavity 22, but outwardly of the end of each shear tab 24 which is positioned closest to the center of the open interior of the cavity 22. Thus, as best shown in FIG. 5, the shear member 20 overlaps or overlays a portion of each shear tab 24 (which portion is referred to herein as the end portion 28 of the shear tab 24). When the shear member 20 is pressed or otherwise advanced into the cavity 22, it contacts the end portions 28 of the shear tabs 24. The leg 16 of the V-rod 12 has a greater hardness and/or shear strength than the head 14, such that continued advancement of the shear member 20 into the cavity 22 causes the shear member 20 to grind or otherwise break away the interfering portion of each shear tab 24 (i.e., the end portions 28 of the shear tabs 24). FIG. 8 shows the state of the shear tabs 24 after the shear member 20 has been fully inserted into the cavity 22, with the end portions 28 having been broken away, leaving only the base portions 26 of the shear tabs 24 intact. In one embodiment, the cavity 22 includes a trough or groove 32 (FIGS. 6 and 7) extending along at least a portion of its perimeter to receive the broken-away end portions 28 of the shear tabs 24, rather than allowing the broken-away end portions 28 to become sandwiched between the facing surfaces of the shear member 20 and the cavity 22.

The material composition of the head 14 of the V-rod 12 and the legs 16 may vary without departing from the scope of the present disclosure. In one embodiment, the head 14 is formed of a D-4512 cast iron material (which is generally ductile) and the legs 16 are formed of a plate steel material with a minimum yield strength of 80 ksi (which is a relatively high strength). In other embodiments, the head 14 and legs 16 may be formed of different materials, provided that the legs 16 (or at least the portion of the legs 16 including the shear member 20) comprise a material having a greater hardness and/or shear strength than the head 14 (or at least the portion of the head 14 including the shear tabs 24) to ensure proper creation of the body bound shear connection or joint 18.

With the end portions 28 of the shear tabs 24 broken away, the base portions 26 of the shear tabs 24 remain intact and extend between the perimeters of the cavity 22 and the shear member 20 (FIG. 4). By such a configuration, the shear member 20 is held in place within the cavity 22 by contact from the base portions 26 of the shear tabs 24 without contacting the perimeter of the cavity 22. In other embodiments, such as those incorporating only one shear tab 24, a shear member 20 may be held in place within a cavity 22 by contact from a shear tab 24 and from the perimeter of the cavity 22.

As best shown in FIG. 4, one of the shear tabs 24b is provided in contact with a radius 34 defined in the perimeter of the shear member 20. While it is possible for the shear member 20 to omit the radius 34 (thus contacting the shear tab 24b with a square edge), it may be advantageous to include the radius 34. In particular, the radius 34 will grind or otherwise break away the end portion 28 of the shear tab 24b in a way that leaves the base portion 26 of that shear tab 24b with a curved outer edge in contact with the radius 34 of the shear member 20. A curved interface between the shear tab 24b and the shear member 20 may serve to better retain and orient the shear member 20 within the cavity 22 than a flat interface (i.e., if the radius 34 of the shear member 20 is replaced with a square edge).

The tight fit between the shear member 20 and the shear tabs 24 may be supplemented by mechanical fasteners 30 that secure the leg 16 of the V-rod 12 to the head 14. While the illustrated embodiment employs mechanical fasteners 30 positioned within the perimeter of the cavity, it is within the scope of the present disclosure for one or more mechanical fasteners 30 positioned outside of the cavity 22 to be used to supplement the tight fit between the shear member 20 and the shear tabs 24.

If the body bound shear connection or joint 18 includes at least one mechanical fastener 30, then a plurality of approaches are possible for forming the body bound shear connection or joint 18. According to one approach, the shear member 20 is advanced or inserted into the cavity 22 until the shear member 20 reaches its final position. At that time, the mechanical fastener(s) 30 may be applied to secure the shear member 20 in place. According to another approach, the shear member 20 is aligned with the cavity 22 and the mechanical fasteners 30 are applied to draw the shear member 20 into the cavity 22 to grind or otherwise break away the end portions 28 of the shear tabs 24. Other assembly methods are also possible without departing from the scope of the present disclosure.

Compared to a conventional technique employing only mechanical fasteners 30 to join two workpieces, the preceding joinder technique may reduce the number of mechanical fasteners 30 employed (e.g., from six to three), thus transferring shear load that would otherwise be experienced by the mechanical fasteners 30 to a bearing load between the shear member 20 and the shear tab or tabs 24. This may decrease the time required to assemble the joint 18, the number of components involved in the joint 18, and possibly the cost and weight of the resulting V-rod 12. Additionally, the tolerancing considerations inherent in a press-fit may be avoided, because the particular degree of overlap between the shear member 20 and the shear tabs 24 (i.e., the size of the end portions 28 of the shear tabs 24 that are broken away in forming the joint 18) may vary without affecting the strength of the resulting joint 18. Accordingly, this joinder technique avoids the disadvantages of conventional joints relying purely upon mechanical fasteners and conventional joints relying upon a press-fit.

Figure 10:
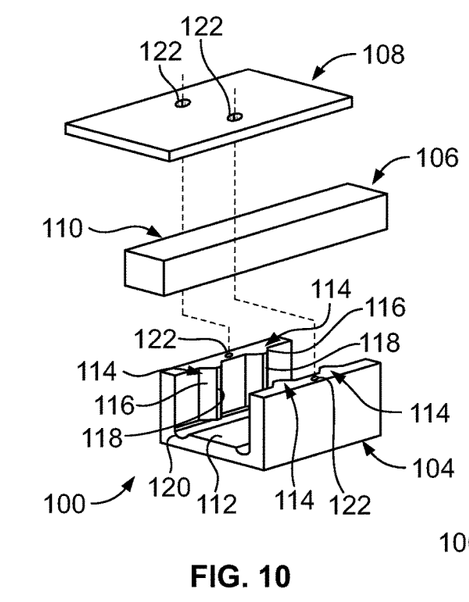
FIG. 10 is an exploded view of the leaf spring seat of FIG. 9.

The joinder technique described above may be employed in other contexts to join two workpieces, rather than being limited to the formation of a fabricated V-rod 12. For example, FIGS. 9-12 illustrate a leaf spring seat 100 with two components joined by a body bound shear connection or joint 102. The leaf spring seat 100 includes a base 104, a leaf spring 106, and a top cap 108 (FIG. 10).

A portion 110 of the leaf spring 106 (which portion of the leaf spring 106 comprises a shear member) is received by a cavity 112 of the base 104. The cavity 112 includes at least one shear tab 114 that extends into the open interior of the cavity 112. In the illustrated embodiment, four shear tabs 114 are provided, with each shear tab 114 being spaced directly across from another shear tab 114, but a different number of shear tabs 114 and/or shear tabs 114 arranged in a different configuration may also be employed without departing from the scope of the present disclosure.

As described above with respect to the shear tabs 24 of FIGS. 2-8, each shear tab 114 includes a base portion 116 and an end portion 118 (FIG. 10). The base portion 116 is associated with the perimeter of the cavity 112, while the end portion 118 is associated with the base portion 116 and positioned closer to the center of the open interior of the cavity 112. As above (and for similar reasons), it may be advantageous for a shear tab 114 to have a tapered configuration, being wider and/or taller adjacent to the perimeter of the cavity 112 (i.e., at the base portion 116) than closer to the center of the open interior of the cavity 112 (i.e., at the end portion 118).

The shear member 110 of the leaf spring 106 may have a perimeter that is generally congruent with the perimeter of the cavity 112, but a smaller size so that at least a portion of the shear member 110 may be received within the cavity 112. The particular shape of the shear member 110 and, hence, the cavity 112 may vary without departing from the scope of the present disclosure. In the illustrated embodiment, the shear member 110 includes parallel square edges facing the shear tabs 114 and perimeter of the cavity 112, which may be advantageous for ensuring the structural integrity and proper operation of the leaf spring 106. Alternatively a portion of the shear member 110 may include a radius, which is advantageous for the reasons described above with respect to the radius 34 of the shear member 20 of FIGS. 1-7.

The perimeter of the shear member 110 is spaced inwardly of the perimeter of the cavity 112, but outwardly of the end of each shear member 114 positioned closest to the center of the open interior of the cavity 112. Thus, the shear member 110 overlaps or overlays a portion of each shear tab 114 (which portion is referred to herein as the end portion 118 of the shear tab 114). When the shear member 114 is pressed or otherwise advanced into the cavity 112, it contacts the end portions 118 of the shear tabs 114. The leaf spring 106 has a greater hardness and/or shear strength than the base 104, such that continued advancement of the shear member 110 into the cavity 112 causes the shear member 110 to grind or otherwise break away the interfering portion of each shear tab 114 (i.e., the end portions 118 of the shear tabs 114). In the illustrated embodiment, the cavity 112 includes a trough or groove 120 extending along at least a portion of its perimeter to receive the broken-away end portions 118 of the shear tabs 114, rather than allowing the broken-away end portions 118 to become sandwiched between the facing surfaces of the shear member 110 and the cavity 112.

Figure 11:
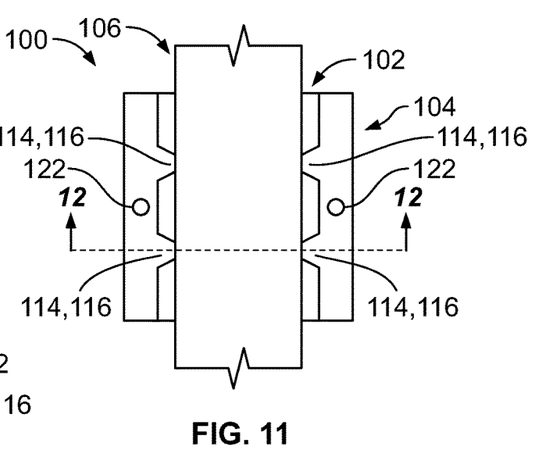
FIG. 11 is a top plan view of the leaf spring seat of FIG. 9.
Figure 12:
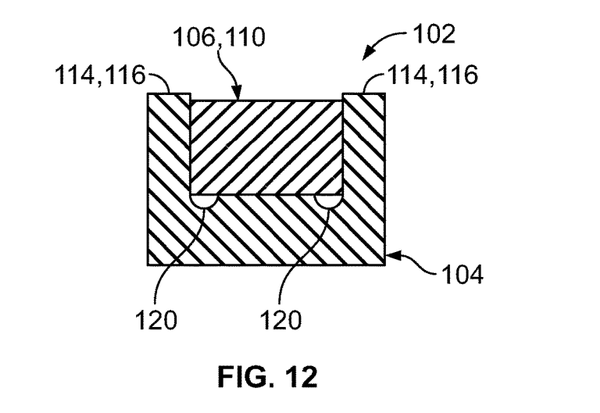
FIG. 12 is a cross-sectional view of the leaf spring seat of FIGS. 9-11, taken through line 12-12 of FIG. 11.

With the end portions 118 of the shear tabs 114 broken away, the base portions 116 of the shear tabs 114 remain intact, extending between the perimeters of the cavity 112 and the shear member 110 (FIG. 11). By such a configuration, the shear member 110 is held in place within the cavity 112 by contact from the base portions 116 of the shear tabs 114 without contacting the perimeter of the cavity 112. In other embodiments, such as those incorporating shear tabs 114 along only one wall of the cavity 112, a shear member 110 may be held in place within a cavity 112 by contact from a shear tab 114 and from the perimeter of the cavity 112.

The tight fit between the shear member 110 and the shear tabs 114 may be supplemented by mechanical fasteners that secure the base 104 to the top cap 108, with the shear member 110 of the leaf spring 106 sandwiched between the base 104 and the top cap 108. In contrast to the embodiment of FIGS. 1-8, the base 104 and top cap 108 include bores 122 which position mechanical fasteners outside of the cavity 112, which is advantageous to avoid passing the mechanical fasteners through the leaf spring 106, which would weaken the leaf spring 106.

If the body bound shear connection or joint 102 includes at least one mechanical fastener, then a plurality of approaches are possible for forming the body bound shear connection or joint 102. According to one approach, the shear member 110 is advanced or inserted into the cavity 112 until the shear member 110 reaches its final position. At that time, the mechanical fastener(s) may be applied to secure the shear member 110 in place. According to another approach, the shear member 110 is aligned with the cavity 112, while the bores 122 of the base 104 are aligned with the bores 122 of the top cap 108. With the components so positioned, the mechanical fasteners are applied to draw the top cap 108 toward the base 104, which advances the shear member 110 into the cavity 112 to grind or otherwise break away the end portions 118 of the shear tabs 114. Other assembly methods are also possible without departing from the scope of the present disclosure.

Figure 13:
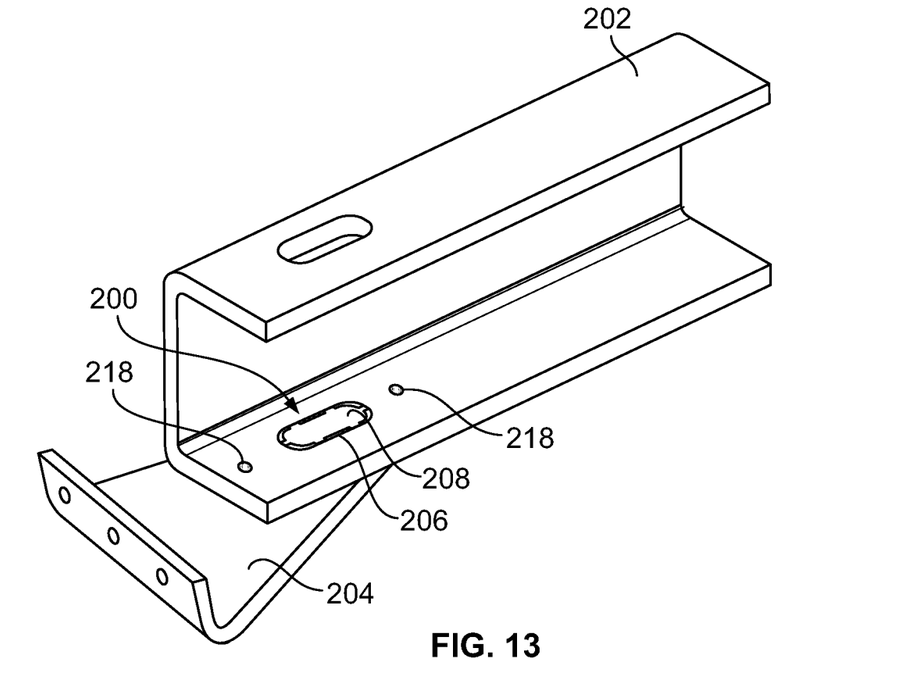
FIG. 13 is a front perspective view of a beam and bracket secured together by a body bound shear connection or joint according to an aspect of the present disclosure.
Figure 14:
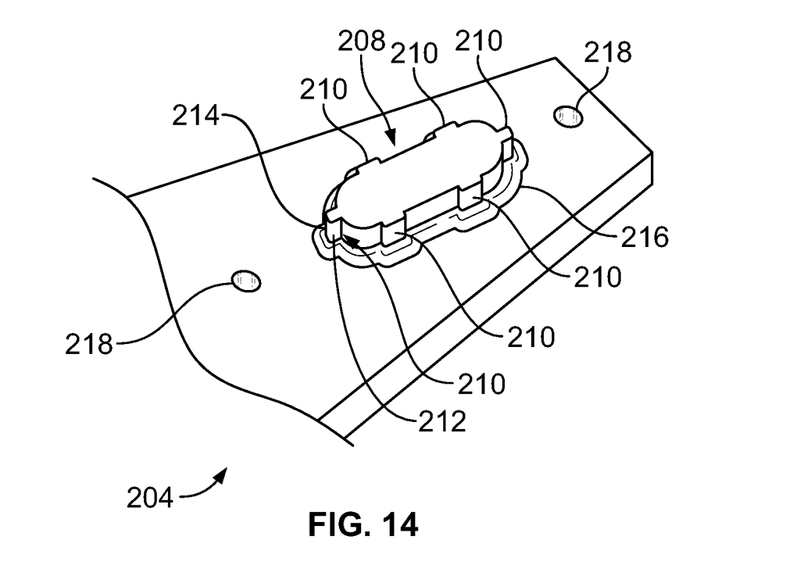
FIG. 14 is a detail perspective view of a portion of the bracket of FIG. 13 including a shear member.

FIGS. 13 and 14 illustrate yet another embodiment. A principal difference between the embodiment of FIGS. 13 and 14 and the embodiments of FIGS. 1-12 is the location of the shear tabs. In the embodiment of FIGS. 13 and 14, a body bound shear connection or joint 200 is formed between a beam or frame rail 202 and a bracket 204. The beam 202 includes a cavity 206, which may be generally featureless, rather than including any shear tabs. Instead, the bracket 204 includes a shear member 208 with at least one shear tab 210 extending outwardly of the perimeter of the shear member 208.

Each shear tab 210 includes a base portion 212 and an end portion 214 (FIG. 14). The base portion 212 is associated with the perimeter of the shear member 208, while the end portion 214 is associated with the base portion 212 and positioned farther from the center of the shear member 208. It may be advantageous for a shear tab 210 to have a tapered configuration, being wider and/or taller adjacent to the perimeter of the shear member 208 (i.e., at the base portion 212) than farther from the center of the shear member 208 (i.e., at the end portion 214), similar to the previously described shear tabs 24 and 114.

The cavity 206 of the beam 202 may have a perimeter that is generally congruent with, but larger than the perimeter of the shear member 208 so that at least a portion of the shear member 208 may be received within the cavity 206. The particular shape of the shear member 208 and, hence, the cavity 206 may vary without departing from the scope of the present disclosure. In the illustrated embodiment, the cavity 206 is generally elliptical or ovoid, which may be advantageous in creating a curved interface when the end portion 212 of each shear tab 210 is broken away.

The outermost end of each shear tab 210 is spaced outwardly of the perimeter of the cavity 206, such that the cavity 206 overlaps or overlays a portion of each shear tab 210 (which portion is referred to herein as the end portion 214 of the shear tab 210). When the shear member 208 is pressed or otherwise advanced into the cavity 206, the cavity 206 contacts the end portions 214 of the shear tabs 210. The beam 202 has a greater hardness and/or shear strength than the bracket 204, such that continued advancement of the shear member 208 into the cavity 206 causes the cavity 206 to grind or otherwise break away the interfering portion of each shear tab 210 (i.e., the end portions 214 of the shear tabs 210). In the illustrated embodiment, the shear member 210 includes a trough or groove 216 extending along at least a portion of its perimeter to receive the broken-away end portions 214 of the shear tabs 210, rather than allowing the broken-away end portions 214 to become sandwiched between the facing surfaces of the beam 202 and the bracket 204.

With the end portions 214 of the shear tabs 210 broken away, the base portions 212 of the shear tabs 210 remain intact, extending between the perimeters of the cavity 206 and the shear member 208 (FIG. 13). By such a configuration, the cavity 206 is held in place about the shear member 208 by contact from the base portions 212 of the shear tabs 210 without contacting the perimeter of the shear member 208. In other embodiments, a cavity 206 may be held in place about a shear member 208 by contact from a shear tab 210 and from the perimeter of the shear member 208.

The tight fit between the cavity 206 and the shear tabs 210 may be supplemented by mechanical fasteners that secure the beam 202 to the bracket 204. The beam 202 and the bracket 204 include bores 218 which position mechanical fasteners outside of the cavity 206, which is necessary to associate the mechanical fasteners to both components (if mechanical fasteners are provided).

If the body bound shear connection or joint 200 includes at least one mechanical fastener, then a plurality of approaches are possible for forming the body bound shear connection or joint 200. According to one approach, the shear member 208 is advanced or inserted into the cavity 206 until the shear member 208 reaches its final position. At that time, the mechanical fastener(s) may be applied to secure the shear member 208 in place. According to another approach, the shear member 208 is aligned with the cavity 206, while the bores 218 of the beam 202 are aligned with the bores 218 of the bracket 204. With the components so positioned, the mechanical fasteners are applied to draw the shear member 208 into the cavity 206 to grind or otherwise break away the end portions 214 of the shear tabs 210. Other assembly methods are also possible without departing from the scope of the present disclosure.

Figures 15, 16, 17, 18:
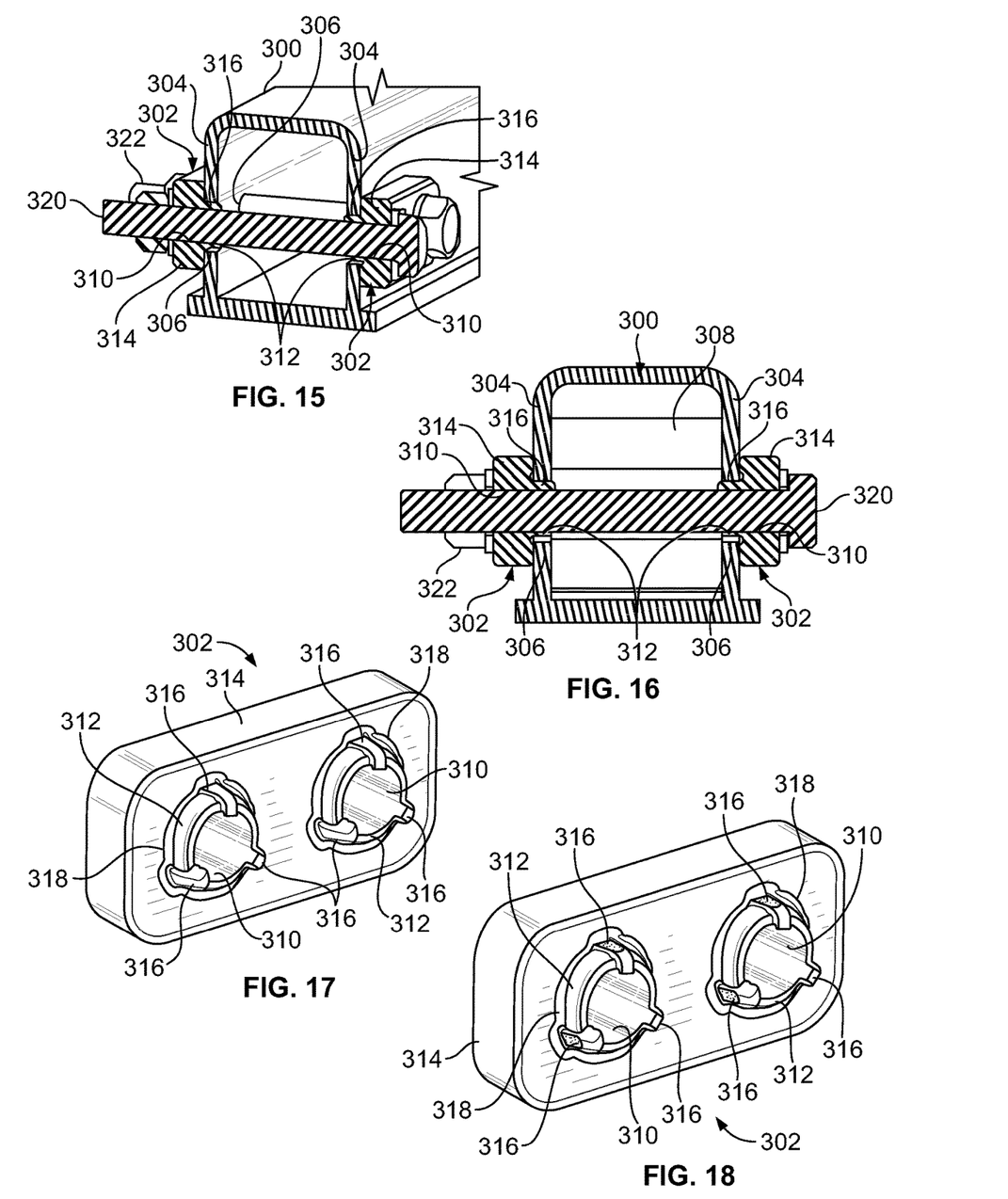
FIG. 15 is a front perspective, cross-sectional view of an assembly in which a pair of workpieces are joined by a pair of body bound shear connections or joints.
FIG. 16 is a cross-sectional end view of the assembly of FIG. 15.
FIG. 17 is a front perspective view of one of the workpieces of the assembly of FIGS. 15 and 16.
FIG. 18 is a front perspective view of the workpiece of FIG. 17, with shear tabs thereof having end portions broken away in creating the body bound shear connections or joints of FIGS. 15 and 16.

While FIGS. 1-14 show a single body bound shear connection or joint being used to connect two workpieces, it should be understood that a plurality of body bound shear connections or joints may be used to connect two workpieces. If a plurality of joints are employed to connect two workpieces, the joints may be substantially identical or differently configured. For example, FIGS. 15 and 16 show an assembly in which a first workpiece 300 is secured to each of a pair of second workpieces 302 by a pair of body bound shear connections or joints. In the illustrated embodiment, the first workpiece 300 comprises a vehicle axle and the second workpieces 302 represent a suspension system component (or a portion of such a component) secured to the vehicle axle (e.g., an axle wrap), although it should be understood that the joinder technique illustrated in FIGS. 15 and 16 may be employed in joining together any of a variety of suitable workpieces. Additionally, it should be understood that the two second workpieces 302 may be portions of the same component, rather than being (or belonging to) different components.

The first workpiece 300 is shown with a pair of generally parallel vertical walls 304, with each vertical wall 304 defining a pair of cavities 306, which are substantially aligned with the cavities 306 of the other vertical wall 304. As shown in FIG. 16, each aligned pair of cavities 306 may include an associated rigid brace 308 extending between the vertical walls 304 for preventing deformation of the vertical walls 304 when a force is applied thereto to join the workpieces 300 and 302, as will be described in greater detail herein.

The two second workpieces 302 (which are shown as being substantially identical, but may be differently configured without departing from the scope of the present disclosure) are shown in greater detail in FIGS. 17 and 18. Each one of the second workpieces 302 defines a pair of bores 310 that are substantially aligned with the bores 310 of the other second workpiece 302 and with the cavities 306 of the first workpiece 300. The bores 310 of the second workpieces 302 are defined through shear members 312, which are each configured as generally tubular projections from a base or body 314 of the second workpiece 302. Each shear member 312 includes at least one shear tab 316 (illustrated as three shear tabs 316 evenly spaced around the outer perimeter of the shear member 312) that may be configured in accordance with the foregoing description of the shear tabs of the other embodiments described herein. The shear members 312 may each be surrounded by a trough or groove 318 (FIGS. 17 and 18) configured to receive end portions of the shear tabs 316 that have been broken away from the associated base portions (as in FIG. 18).

Prior to joinder, the shear members 312 may be aligned with the cavities 306 (with the shear members 312 facing the associated vertical wall 304 of the first workpiece 300), with a mechanical fastener 320 (e.g., a bolt) extending through each one of the aligned sets of cavities 306 and bores 310. Upon tightening or otherwise actuating the mechanical fastener 320 (e.g., by threading a nut 322 onto the mechanical fastener 320) to secure the workpieces 300 and 302 together, each shear member 312 is advanced into the associated cavity 306, with the end portions of the shear tabs 312 being broken away from the associated base portions, as described above with regard to the other embodiments presented herein. If provided, portions of the shear members 312 and the mechanical fastener 320 pass through a channel defined in the brace 308, as shown in FIG. 16.

In contrast to the other embodiments described herein, each of the cavities 306 has a substantially circular perimeter, with the associated shear members 312 having a similar, generally circular perimeter. While the body bound shear connection formed between each cavity 306 and associated shear member 312 should be sufficiently tight and secure to prevent rotation of the shear member 312 within the cavity 306, joining the first workpiece 300 to each second workpiece 302 by a second body bound shear connection ensures that there will be no such rotation. Thus, joining a pair of workpieces using a plurality of body bound shear connections may be advantageous when it is desirable (e.g., due to cost considerations) to provide a cavity having a circular perimeter or when a plurality of body bound shear connections provide functional advantages that cannot be achieved using a single body bound shear connection (e.g., due to the shape or configuration of one or both of the workpieces).

Figure 19:
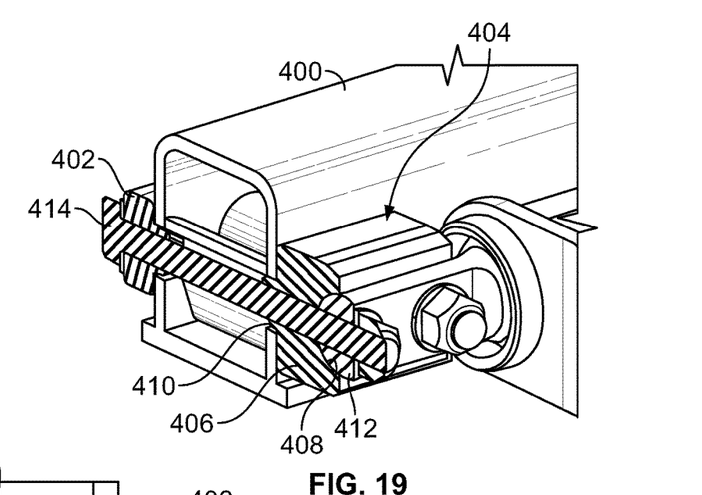
FIG. 19 is a front perspective, cross-sectional view of an assembly in which a pair of workpieces are joined by a pair of body bound shear connections or joints.
Figure 20:
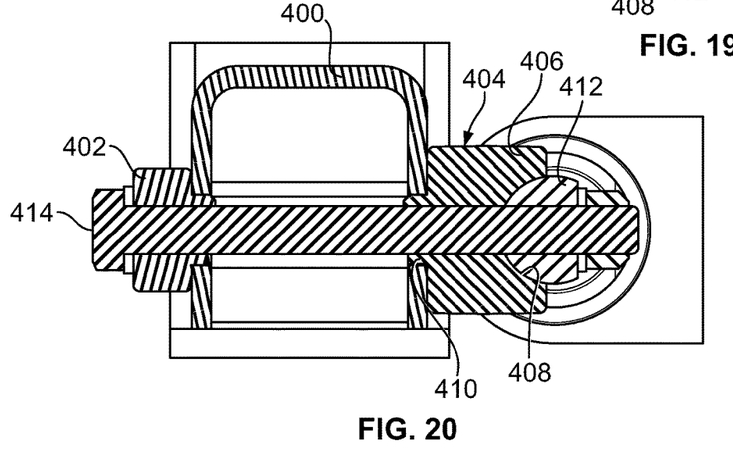
FIG. 20 is a cross-sectional end view of the assembly of FIG. 19.
Figure 21:
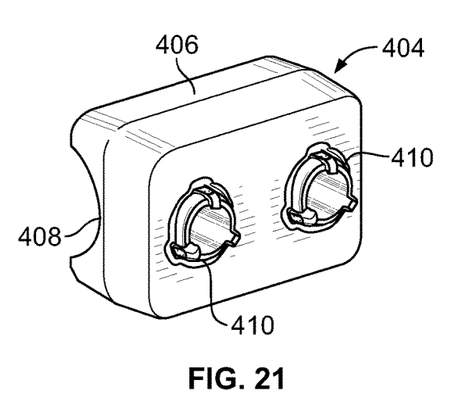
FIG. 21 is a front perspective view of one of the workpieces of the assembly of FIGS. 19 and 20.
Figure 22:
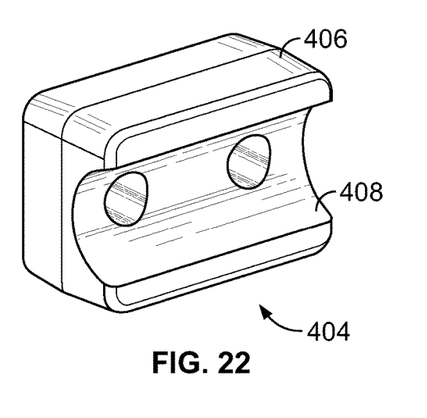
FIG. 22 is a rear perspective view of the workpiece of FIG. 21.

FIGS. 19 and 20 illustrate an assembly that is a variation of the assembly of FIGS. 15 and 16. The first workpiece 400 and one of the second workpieces 402 of FIGS. 19 and 20 are configured as in FIGS. 15 and 16, but the other second workpiece 404 is provided with a modified base or body 406 defining a channel 408 positioned opposite the shear members 410 (FIGS. 21 and 22). The channel 408 is configured to accommodate a portion of another component 412 of the assembly (e.g., a portion of wishbone-shaped suspension linkage of the type described in U.S. Pat. No. 7,516,968, the disclosure of which is hereby incorporated herein by reference). Thus, when securing the first workpiece 400 to the second workpieces 402 and 404, a longer mechanical fastener 414 is provided to allow it to pass through the portion of the component 412 received by the channel 408, but the joinder technique (i.e., tightening or otherwise actuating the mechanical fastener 414 to create body bound shear connections) is otherwise as described above with respect to the assembly of FIGS. 15 and 16.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A joint comprising:
a first workpiece defining a cavity; and
a second workpiece including a shear member at least partially received within the cavity to secure the first workpiece to the second workpiece, wherein
one of the first and second workpieces has a lower hardness and/or shear strength than the other one of the first and second workpieces,
said one of the first and second workpieces having a lower hardness and/or shear strength includes at least one shear tab having a base portion extending between the cavity and the shear member,
said other one of the first and second workpieces has a perimeter configured to overlap an end portion of the at least one shear tab prior to the shear member being inserted into the cavity, and
the end portion of the at least one shear tab is broken away in inserting the shear member into the cavity, with the remainder of the at least one shear tab comprising the base portion extending between the cavity and the shear member to secure the first workpiece to the second workpiece.

2. The joint of claim 1, wherein the at least one shear tab has a tapered configuration in which the base portion is wider and/or taller than the end portion.

3. The joint of claim 1, wherein the shear member includes a perimeter that is generally congruent with a perimeter of the cavity.

4. The joint of claim 1, wherein the cavity includes a trough or groove extending along at least a portion of a perimeter of the cavity configured to receive the broken-away end portion of the at least one shear tab.

5. The joint of claim 1, wherein the first and second workpieces are secured together without a perimeter of the shear member contacting a perimeter of the cavity.

6. The joint of claim 1, wherein the first and second workpieces are secured together with a perimeter of the shear member contacting a perimeter of the cavity.

7. The joint of claim 1, wherein the base portion of the at least one shear tab includes a curved outer edge.

8. The joint of claim 1, wherein said one of the first and second workpieces having a lower hardness and/or shear strength includes a plurality of shear tabs.

9. The joint of claim 8, wherein at least two of the shear tabs are substantially identical.

10. The joint of claim 8, wherein at least two of the shear tabs are differently configured.

11. A method of joining first and second workpieces, comprising:

providing a first workpiece defining a cavity and a second workpiece including a shear member, wherein one of the first and second workpieces has a lower hardness and/or shear strength than the other one of the first and second workpieces and said one of the first and second workpieces having a lower hardness and/or shear strength includes at least one shear tab; and inserting at least a portion of the shear member into the cavity so as to bring at least a portion of a perimeter of said other one of the first and second workpieces into contact with the at least one shear tab and break away an end portion of the at least one shear tab, with the remainder of the at least one shear tab comprising a base portion extending between the cavity and the shear member to secure the first workpiece to the second workpiece.

12. The method of claim 11, further comprising securing the first and second workpieces together with a mechanical fastener.

13. The method of claim 12, wherein the end portion of the at least one shear tab is broken away prior to securing the first and second workpieces together with the mechanical fastener.

14. The method of claim 12, wherein the end portion of the at least one shear tab is broken away by securing the first and second workpieces together with the mechanical fastener.

* * * * *